April 8, 1941.                R. C. COOLEY                2,237,926
                              DENTAL PATTERN
                            Filed June 24, 1937

Ralph C. Cooley.  Inventor
D.D.S., F.I.C.D.

By Edward U. Hardway,
Attorney

Patented Apr. 8, 1941

2,237,926

UNITED STATES PATENT OFFICE 2,237,926

DENTAL PATTERN

Ralph C. Cooley, Houston, Tex.

Application June 24, 1937, Serial No. 150,150

5 Claims. (Cl. 32—15)

This invention relates to dental patterns and more particularly to dental wax or impression compound patterns for the taking of impressions and bites and particularly useful in, and adapted to the process of, making inlays for dental cavities in the restoration of human teeth.

In the development or manufacture of an inlay by a dentist, it is first necessary to obtain, with wax, impression compound or other suitable plastic material, an exact impression of the cavity to be filled and restored. An exact pattern of the missing portion, or portions of the tooth is then developed and produced by molding and carving according to the well known process commonly practiced in the dental art.

At the present time these waxes, impression and plastic compounds are only available to the dentists and the dental trade in the form of sticks, cones and blocks with no consideration as to their adaptability to the basic types of the cavities in the teeth. Accordingly, it has been necessary for the dental operator to trim, mold, heat and reheat, adapt and readapt these incongruous sticks, cones or blocks before an impression or pattern of the cavity could be obtained and developed.

It is one object of this invention to provide shapes and forms of inlay waxes and impression compounds that will so closely approximate the shape and size of the basic type of cavity each is designed to fit, that one heating of the pattern will cause it to quickly, readily and accurately adapt itself to the form of the cavity to be restored.

This will conduce to greater accuracy and a substantial saving of time.

In the art of dentistry it is well known that irrespective of the form or position of the destruction, occasioned by dental caries, the cavity as prepared for restoration by the dental operator will come under one of the five classifications of cavities as outlined and described in the text book "Operative Dentistry," Black, vol. II, seventh edition, 1936, page 72, which is the accepted authority on dental nomenclature, and to which reference is here made.

The invention herein described embodies wax or impression compound patterns composed of plastic materials and designed to soften and become more plastic at temperatures not exceeding 120° Fahrenheit, so that it will not cause discomfort when applied, and yet be readily and quickly adaptable to the walls, sharp angles and prepared margins of the cavity to which they are adapted. These materials are likewise prepared and designed to become rigid at body temperature (98.6° Fahrenheit), without warpage or change of form and to become extremely hard and resistant when cooled to a temperature of 85° Fahrenheit or less.

The invention herein described includes pattern waxes and impression compounds made in such a variety of sizes and shapes that they may be adapted to each classification of cavity form, whether the cavity or the tooth be large or small, and having ample material to adapt to all angles, surfaces and outlines of the cavity and still contain sufficient excess material to complete the external contours of the restoration.

These patterns or forms of wax or impression compound are dipped into hot water or passed over a Bunsen flame and are then pressed into the cavity by finger pressure, or with a broad bladed instrument, or by permitting the patient to bite upon them with the opposing teeth, whichever is most desirable in the given case.

Details of the molds or pattern forms of the waxes and impression compounds and included in this invention all present surfaces, line angles and planes that converge toward the cavo-surface of the pattern.

These cavo-surfaces are relatively thin, as compared to the body of the pattern, and are more quickly heated and become more thoroughly plastic upon the application of either moist or dry heat, while the thicker portions remain more resistant and less plastic and act as a plunger as they are forced down upon the very plastic cavo-surface upon which they converge, thus adapting the plastic mass perfectly into the minute details of the cavity, its surfaces, angles and outlines.

With the above and other objects in view the invention has particular relation to certain novel features of construction and use, examples of which are given in this specification and illustrated in the accompanying drawing, wherein—

Figure 1 presents a side view of a wedge shaped pattern or form designed to be readily adapted to class I, class III, class IV and class V cavities.

Figure 2 presents a cavo-surface view thereof.

Figure 3 presents a cavo-surface view of a pattern designed for that type of class II cavities which involve the occlusal surface of a bicuspid or molar tooth and only one of the proximal surfaces.

Figure 4 shows a side view of the form shown in Figure 3.

Figure 5 discloses a proximal view thereof.

Figure 6 discloses a front or mesio-distal view thereof.

Figure 7 presents a cavo-surface view of a pattern designed for that type of class II cavities which involve the occlusal surface of a bicuspid or molar tooth and both proximal surfaces—mesial and distal.

Figure 10:
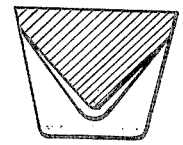

Figure 10 presents a cross-sectional view, cut bucco-lingually, thereof.

Figure 1:
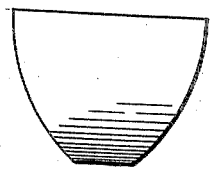
Figure 2:
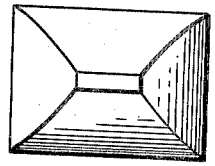
Figure 3:
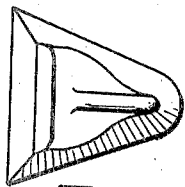
Figure 4:
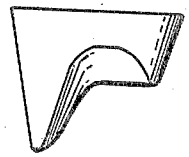
Figure 5:
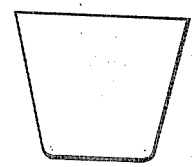
Figure 6:
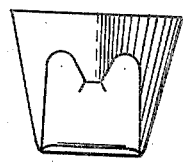
Figure 7:
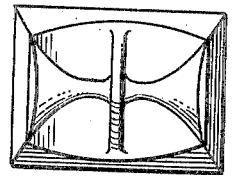
Figure 8:
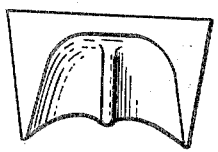
Figure 8 shows a side view thereof.
Figure 9:
Figure 9 shows one of the two proximal surfaces thereof.

Referring more particularly to the drawing the type of pattern shown in Figures 1 and 2 is formed with an approximately wedge-shaped cavo-surface terminating in a relatively sharp edge which, when heated, may be readily driven to the base of the type of cavities to which it is adapted, readily conforming itself accurately to the interior surface of this type of cavity and expelling the air or moisture as continued pressure adapts it just as accurately to the side walls and margins of the cavity.

The form illustrated in Figures 3 to 6, inclusive, present a pattern essentially triangular in shape, except its proximal surface, with all surfaces and line angles converging upon the thinner and more delicate cavo-surfaces and angles. It is so shaped to conform to class II cavities in bicuspids and molars involving the occlusal surface and only one of the proximal surface; and the thin edges and tapering surfaces designed for ease of heating and greater plasticity in adapting to the intricate details within the cavity.

Figures 7 to 10, inclusive, present a pattern essentially rectangular in shape, on its occlusal surface and proximal surfaces, all converging upon a thin cavo-surface presenting the general appearance of two triangles joined together at their apices in the median line. It is so shaped to conform with class II cavities in bicuspids and molars involving the occlusal surface and both proximal surfaces—mesial and distal; and the thin edges and tapering surfaces designed for ease of heating and greater plasticity in adapting to the intricate detail within the cavity.

Although all of the patterns will be made in a variety of sizes to fit both large and small cavities in large and small teeth, they will always appear in one of these three basic forms above illustrated and described. A selected pattern will then approximate the form of an individual cavity so closely that slight warming and pressure will cause it to adapt itself to the walls and angles of the cavity quickly and accurately. Any surplus material extending beyond the outlines of the cavity may then be carved away until all external contours of the tooth conform to normal anatomy and to the proximating and occluding teeth.

The drawing and descriptions disclose what are now considered to be preferred and original forms of the invention by way of illustrations only, while the broad principle of the invention will be defined by the appended claims.

What I claim is:

1. A partially formed pattern for taking an impression of the walls of a prepared dental cavity, said article being composed of pliable material and formed with an enlarged outer body containing surplus material and a reduced extension and a cross web carried by the body, said extension and cross-web being much thinner than the outer body.

2. A dental pattern formed of pliable material and comprising a relatively wide, approximately flat, base, an extension formed on the base, having opposite pairs of sides converging at different angles relative to the base and terminating in a thin edge so that said edge is substantially longer than it is wide.

3. A dental pattern formed of pliable material and comprising a relatively wide, approximately plane, base, a wedge-shaped extension formed on the base and terminating in a thin edge, a wedge-shaped web on the base extending transversely with respect to the extension and terminating in a thin edge whose inner end joins said extension, the edge of the extension extending out further from the base than the edge of the web, the angles formed by the sides of the extension and web being acute whereby said edges will contact the bottom of a prepared cavity of a tooth before the sides of the extension and web contact the walls of the cavity and surface of the tooth.

4. A tooth pattern formed of pliable material and comprising a base, extended parallel end wedges on the base which terminate in thin edges, a transverse web connecting said edges and whose margin is thin, said edges being extended outwardly beyond the margin of the web, said wedges and web being gradually tapered whereby said edges and the web margin will extend to the bottom of a prepared cavity of a tooth before the base contacts the walls of the cavity and the surface of the tooth.

5. A tooth pattern formed of pliable material and comprising a base, extended parallel end wedges on the base which terminate in thin edges, a transverse tapered web connecting the edges of said end wedges whose margin is thin, a rib extending transversely of the center of said web and projecting slightly outwardly from the web and web margin, said edges being extended outwardly beyond the rib and the outer margin of the web, said wedges and web being gradually tapered whereby said edges, web margin and projecting rib extend to the bottom of a prepared cavity of a tooth before the base contacts the walls of the cavity and surface of the tooth.

RALPH C. COOLEY.